United States Patent Office 3,547,911
Patented Dec. 15, 1970

3,547,911
SYNTHESIS OF ANTHERIDIOL AND
ITS DERIVATIVES
John H. Fried, Palo Alto, and John A. Edwards, Los Altos, Calif., assignors to Syntex Corporation, Panama, Panama, a corporation of Panama
No Drawing. Filed Dec. 23, 1968, Ser. No. 786,359
Int. Cl. C07c *173/00*
U.S. Cl. 260—239.57
12 Claims

ABSTRACT OF THE DISCLOSURE

Synthesis of the plant hormone, antheridiol, and novel derivatives thereof, and novel intermediates for the preparation thereof.

The present invention relates to cyclopentanopolyhydrophenanthrene derivatives and to processes for their preparation. Specifically, the present invention is directed to the total synthesis of the plant hormone antheridiol, and related derivatives, from known starting compounds as well as to novel intermediate compounds useful in this synthesis.

Antheridiol is a plant hormone which initiates or governs sexual reproduction in certain species of aquatic fungi from which it is naturally produced. Its activity relative to the sexual reproduction of these species makes it important in the control and regulation of plant fertility. Antheridiol has been assigned the following structural Formula A:

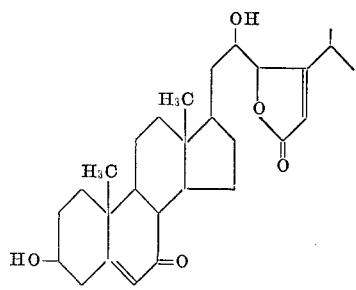

(A)

This assignment is made without regard to the stereochemistry of the verious asymmetric carbon atoms which are present in the side chain attached to the C–17 position of the basic steroid nucleus. These isomers with respect to the C–22 and C–23 centers of isomeric activity include the $22\alpha_F,23\beta_F$; $22\beta_F,23\alpha_F$; $22\alpha_F,23\alpha_F$; and $22\beta_F,23\beta_F$ specific compounds, namely, $3\beta,22\alpha_F,23\alpha_F$-trihydroxy-24-carboxymethylenecholest-5-en-7-one 23,24″-lactone.
$3\beta,22\beta_F,23\beta_F$-trihydroxy-24-carboxymethylenecholest-5-en-7-one 23,24″-lactone,
$3\beta,22\alpha_F,23\beta_F$-trihydroxy-24-carboxymethylenecholest-5-en-7-one 23,24″-lactone, and
$3\beta,22\beta_F23\alpha_F$-trihydroxy-24-carboxymethylenecholest-5-en-7-one 23,24″-lactone.

The designations alpha ($\alpha$) and beta ($\beta$) for the side chain substituents in the above nomenclature are used in accordance with the Fischer convention, hence the use of subscript "F." In this respect, the respective four compounds can be sterically depicted as follows:

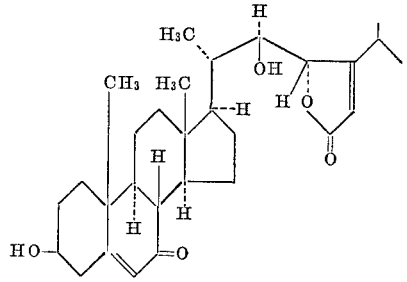

(A-1)

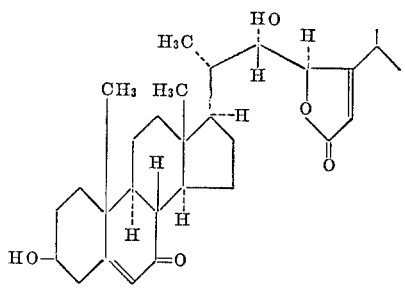

(A-2)

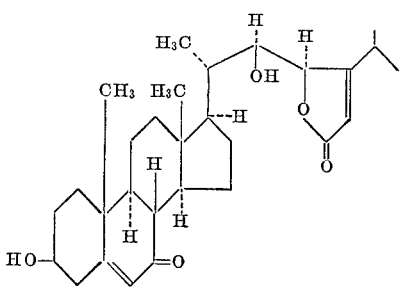

(A-3)

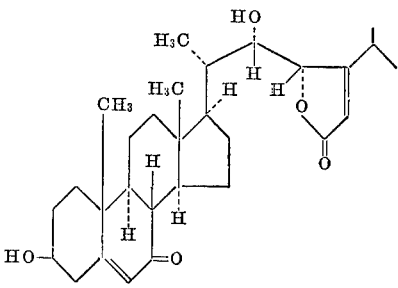

(A-4)

Each of these compounds is useful as a plant growth regulator particularly with respect to the control and regulation of plant reproduction and they can be employed in the same manner as antheridiol.

These compounds are also useful as anti-bacterial and anti-fungal (both plant and animal) agents for the control of and inhibition in the growth of a number of fungal and bacterial pests, such as *Achylia bisexualis*, *Candida albicans*, *Trichophyton mentagrophytes*, *Bacillus subtillus*, and the like. In these uses, good results are obtained with methods employing and compositions containing fungicidal and bacteriocidal amounts or concentrations sufficient to provide for the control or inhibition in the growth of the treated fungal and bacterial organisms. Generally, they are orally administered in daily amounts ranging from about 0.1 milligram to about 10 milligrams per kilogram of infected host body weight. Amounts higher or lower than these can be employed depending upon the organism treated and the response thereto. The administration can be done by means of single or multiple dosages. These compounds are also topically active and can be used in compositions at a concentration of from about 0.1 percent to 5 percent by weight.

In each of these uses, the compounds can be administered alone, in combination with other medicinal agents, or in admixture with various pharmaceutically acceptable non-toxic excipients. These compositions may be in the form of powders, capsules, pellets, pills, solutions, creams, lotions, ointments, aerosols, and so forth. These compounds may also be admixed with various adjuvants and addicaments. For example, they can be dispersed on an inert finely divided solid and employed as dusts or they can be dispersed in water with or without the aid of a surface active agent and employed as sprays. They may also be employed as the active components in oil-in-water and water-in-oil emulsions and aqueous dispersions.

The novel process of the present invention relates to the synthesis of antheridiol and to its related compounds as depicted above in Formula A and A–1, A–2, A–3 and A–4. This process comprises the steps of treating a 3β-oxygenated-22,23-bisnorchol-5-en-24-aldehyde with a trans 3,4-dimethylpent-2-enoic acid lower alkyl ester and lithium triphenylmethide to furnish the corresponding 3β-oxygenated - 22 - hydroxy-24-carboxymethylenecholest-5-ene 22,24″ - lactone; converting said 3β-oxygenated-22-hydroxy - 24-carboxymethylenecholest-5-ene 22,24″-lactone to the corresponding 3β-oxygenated-24-carboxymethylenecholesta-5,22-diene by alkaline hydrolysis; treating said 3β - oxygenated-24-carboxymethylenecholesta-5,22-diene with at least about two chemical equivalents of peracid or successively with about one chemical equivalent each of peracid and osmium tetroxide to furnish the corresponding 3β - oxygenated-5,6-oxido-22,23-dihydroxy-24-carboxymethylenecholestane 23,24″-lactone; treating said 3β - oxygenated - 5,6-oxido-22,23-dihydroxy-24-carboxymethylenecholestane 23,24″-lactone compound with zinc dust, sodium iodide, and sodium acetate to form the corresponding 3β - oxygenated-22,23-dihydroxy-24-carboxymethylenecholest-5-ene 23,24″-lactone; and oxidizing said 3β - oxygenated-22,23 - dihydroxy-24-carboxymethylenecholest5-ene 23,24″-lactone to furnish the corresponding 3β - oxygenated - 22,23-dihydroxy-24-carboxymethylenecholest-5-en-7-one 23,24″-lactone product. This process is outlined by the following reaction scheme in which, for brevity and convenience, only partial formulas are depicted.

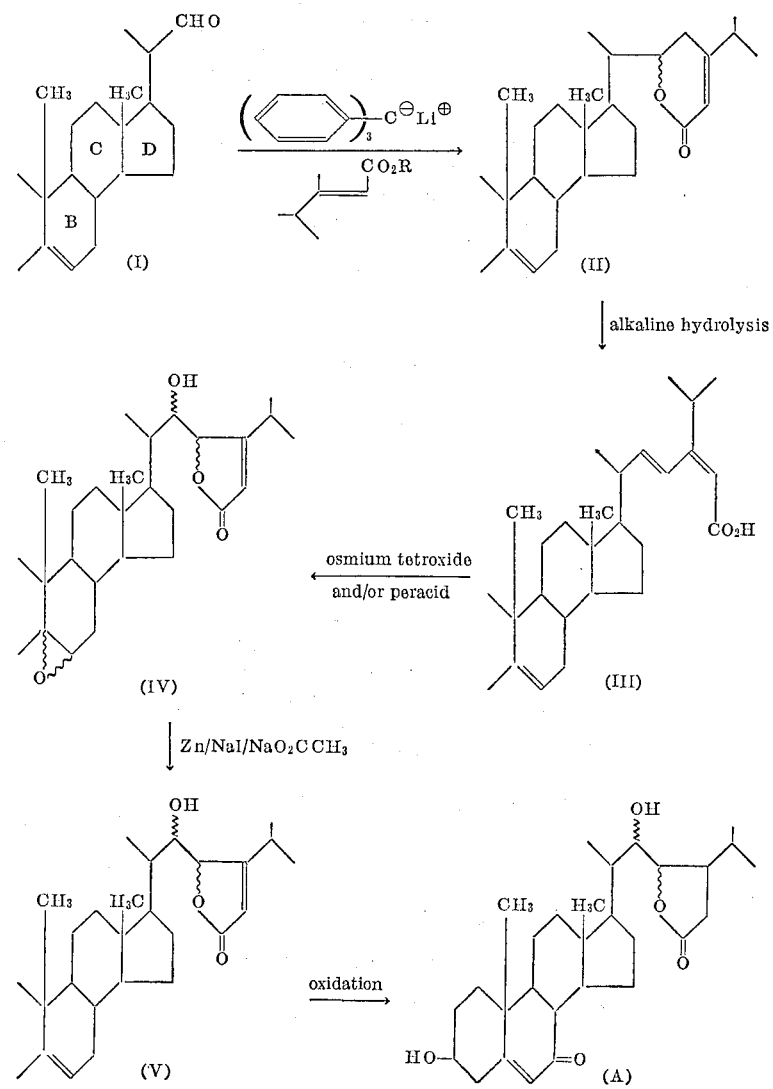

In the above and succeeding formulas, R is an alkyl group containing one to four carbon atoms, that is, methyl, ethyl, n-propyl, isopropyl, n-butyl, isobutyl, secbutyl, and t-butyl, preferably methyl or ethyl. The letters B, C, and D within the respective rings of Formula I and the following formulas by reference and extension denote the usual reference to the B, C and D rings of the cyclopentanopolyhydrophenanthrene or steroid nucleus. In addition and although not shown, the stereochemistry of the C–3, 8, 9, 10, 13, 14, 17 and 20 carbon atoms is respectively beta, beta, alpha, beta, beta, alpha, beta and beta as designated in formulas A–1, A–2, A–3 A4. Each of the isomers related to the C–22 and C–23 (where present) asymmetric carbon atoms are all included in the presentation of the Formulas II, IV, V and A, by the use of wavy lines ($\int$), namely, $22\beta_F,23\alpha_F$; $22\alpha_F,23\beta_F$; $22\alpha_F,23\alpha_F$; and $22\beta_F,23\beta_F$, all, as designated, by Fischer convention. In the present specification and claims, the term "oxygenated" in reference to the C–3$\beta$ position of the compounds involved in the process hereof refers to a 3$\beta$-hydroxy or a conventional ether or ester thereof.

With further and more detailed reference to the above reaction scheme, the bisnorcholene aldehyde starting compound (I) can be prepared in various manners. One such involves reducing a 3-oxygenated-22, 23-bisnorchol-5-en-24-oic acid lower alkyl ester with lithium aluminum hydride to provide the 3-oxygenated-24-hydroxy-22,23-bis-norchol-5-ene alcohol. This alcohol is then oxidized with a di(hydrocarbon)carbodiimide, for example, dicyclohexycarbodiimide, in a sulfoxide solvent, for example, dimethylsulfoxide and in the presence of a catalytic amount of an acid such as phosphoric acid and trifluoroacetic acid. This oxidation procedure furnishes the corresponding aldehyde compound (I) referred to and depicted above.

It is preferable to employ a starting compound (I) which contains a protected 3$\beta$-hydroxyl group during the first step of the process hereof (I→II). This is not an absolute necessity, however, if an excess of lithium triphenylmethide reactant is employed. The protecting group, if employed, can be selected from hydrolyzable groupings including those commonly employed for such purposes. Preferred groups include the carboxylic acid esters, such as acetate, propionate, butyrate, enanthate and caproate, which are base hydrolyzable and the cyclic ethers, such as tetrahydrofuran-2-yloxy and tetrahydropyran-2-yloxy, which are acid hydrolyzable. The protecting group employed, if base hydrolyzable, is removed in the second step alkaline hydrolysis. An employed acid hydrolyzable protecting group can be removed by mild acid hydrolysis either prior to or after the alkaline hydrolysis second step.

When employing an ether protecting group, it can be introduced early into the 3$\beta$-hydroxy-22,23-bisnorchol-5-enoic acid lower alkyl ester in preparing the starting compound (I) hereof before the lithium aluminum hydride reduction step. Such introduction is accomplished in the manners known per se by treating the hydroxy derivative with dihydrofuran or dihydropyran in the presence of acid catalyst, such as p-toluene-sulfonic acid or p-toluene-sulfonyl chloride. The ester protecting group, if employed, is preferably introduced into the starting aldehyde (I). This is accomplished in the known and conventional methods of treating the hydroxyl with the appropriate carboxylic acid anhydride in base medium, such as pyridine and lutidine.

The first step of the novel process hereof comprises treating the aldehyde (I) with a lower alkyl 3,4-dimethylpent-2-enoate:lithium triphenylmethide reagent. In this procedure, the aldehyde starting compound is treated with at least one molar equivalent and preferably an excess of the lower alkyl 3,4-dimethylpent-2-enoate:lithium triphenylmethide reagent. The lower alkyl 3,4-dimethylpent-2-enoate:lithium triphenylmethide reagent for this process is prepared by first reacting together n-butyl lithium and triphenylmethane to prepare lithium triphenylmethide and thereafter adding the trans lower alkyl 3,4-dimethylpent-2-enoate ester thereto. The trans lower alkyl 3,4-dimethylpent-2-enoate ester is prepared, in turn, by treating 3-methylbutan-2-one with triethylphosphonoacetate.

In carrying out this reaction, a solution of n-butyl lithium in hexane is mixed together with a solution of triphenylmethane in organic reaction medium. The ensuing reaction is continued at about room temperature and under a nitrogen atmosphere. The mixture is cooled to from −24° C. to 0° C. (approximately) for the addition of the dimethylpentanoate. Following this, the mixture is cooled to from about −100° C. to about −20° C., preferably about −80° C. and the aldehyde (I) is added thereto. The temperature is then allowed to rise to from about −20° C. to 0° C. and maintained for a period of time sufficient to complete the reaction. Suitable organic reaction media for this process include tetrahydrofuran, dimethylacetamide, dioxane, benzene, toluene, or appropriate mixtures thereof. The lactonized product (II) is recovered via conventional techniques, such as chromatography, or it can be used without recovery in the next step.

The next step comprises the alkaline hydrolysis of the lactone (II). The alkaline hydrolysis serves to cleave the side chain lactone and provide the conjugated dienoic acid. The alkaline hydrolysis is conducted with an alkali metal hydroxide, such as sodium hydroxide or potassium hydroxide, in organic liquid reaction medium. Suitable media include the lower alkanols, preferably methanol. A base hydrolyzable protecting group at C–3$\beta$ is also cleaved in this process. If an ether protecting group is employed at C–3$\beta$ during this reaction, it can be removed at this point or later in the process with mild acid hydrolysis. If the acid hydrolysis is required for this purpose, and it is desired to perform such at this point, the preferred sequence involves alkaline hydrolysis immediately followed by acid hydrolysis. Thus prepared upon hydrolysis in accordance with these techniques is the conjugated diene acid (III). This can be isolated via chromatography and the like or utilized without recovery in the next step.

The third step in this process comprises treating the conjugated dienoic acid (III) with at least about two chemical equivalents of peracid or successively about one chemical equivalent each of peracid and osmium tetraoxide. Suitable peracids for this process include m-chloroperbenzoic acid, peracetic, perbenzoic, monoperphthalic, and the like. By treating the dienoic acid (III) with at least about two chemical equivalents of peracid, the two $22\alpha_F,23\alpha_F$ and $22\beta_F,23\beta_F$, 5,6-oxido 5-membered ring lactones (IV) are prepared in predominant amounts. Also prepared in lesser amounts are the corresponding two $22\alpha_F,23\alpha_F$ and $22\beta_F,23\beta_F$ 6-membered ring lactone isomers of 5,6-oxido-22,23-dihydroxy - 24 - carboxymethylenecholestane 22,24″-lactone. These latter compounds can be separated from and subsequently converted to the 5-membered ring lactone compounds of Formula IV, if desired, upon chromatography followed by mild alkaline hydrolysis, such as with dilute potassium hydroxide or carbonate in methanol.

In carrying out this peracid reaction by which the 5-membered ring lactones (IV) and 6-membered ring lactones are prepared, the dienoic acid (III) and peracid are reacted and maintained together at temperature of from 0° C. to about 50° C., preferably about room temperature and for a period of time sufficient to complete the reaction ranging from about 24 to 120 hours. This reaction is conveniently conducted in organic liquid medium, such as methylene chloride, tetrahydrofuran, diether, and the like. The four compounds (two isomers each of the 5-member lactone and 6-member lactone products) are separated and recovered via conventional techniques including chromatography, fractional crystallization, and so forth.

In this process, it is essential and critical that at least two moles of peracid be employed per mole of dienoic acid starting compound. Conveniently, a large excess, upwards of a five-fold or ten-fold molar excess, of the peracid is used without detrimental results. Preferred concentrations are the use of from 2.2 moles or chemical equivalents to about 5 moles or chemical equivalents of peracid per mole or chemical equivalents of dienoic acid.

When treating the dienoic acid (III) successively with about one chemical equivalent each of peracid and osmium tetraoxide, the two $22\alpha_F,23\beta_F$ and $22\beta_F,23\alpha_F$ 5,6-oxido 5-membered ring lactones (IV) are ultimately prepared. These are separable by chromatography. The peracid step is performed as described above except that amounts of peracid are employed which range from about 1 mole or chemical equivalent to about 1.3 moles or chemical equivalents per mole of dienoic acid and for a period of time ranging from a few minutes to about one hour. Thus prepared is the corresponding 5,6-oxido dienoic acid including the $5\alpha,6\alpha$- and $5\beta,6\beta$-oxido derivatives. Treatment thereof, with or without recovery from the peracid treatment, with osmium tetraoxide affords the two $22\alpha_F,23\beta_F$ and $22\beta_F,23\beta_F$ 5,6-oxido 5-membered ring lactone products (IV).

In carrying out this latter reaction, the 5,6-oxido dienoic acid is reacted and maintained together with osmium tetraoxide for a period of time sufficient to complete the reaction ranging from about a few minutes to about 24 or more hours. The reaction is conveniently conducted in organic liquid reaction medium. Suitable media include pyridine, lutidine, benzene, and the like. Temperatures of about room temperature are preferred although temperatures above or below room temperature can be employed. The 5,6-oxido dienoic acid and osmium tetraoxide are convenient order and fashion and are employed in amounts of about one mole or chemical equivalent of 5,6-oxido dienoic acid per mole or chemical equivalent of osmium tetraoxide. Upon the completion of the reaction, the intermediate osmate ester is reduced with aqueous mannitol or with hydrogen sulfide or with an excess of sodium bisulfite in aqueous pyridine and the resulting $5\alpha,6\alpha$-oxido 5-membered ring lactone (IV) is recovered from the reaction mixture via conventional means, such as extraction, filtration, decantation, evaporation, and chromatography.

The 5,6-oxido 5-membered ring lactone (IV) is then treated with zinc dust and sodium iodide in aqueous acetic acid medium to convert it to the corresponding $\Delta^5$ unsaturated derivative (V). This reaction which involves the replacement of the oxido moiety with the $\Delta^{5(6)}$ double bond is commonly referred to as the Cornforth reaction. This reaction is preferably conducted at about room temperature and for a period of time sufficient to complete the reaction. The reactants are contacted and maintained together in any convenient order or fashion. In a preferred procedure, the steroid lactone (IV) is added to a sodium iodide, aqueous acetic acid solution and zinc dust is thereafter added to the resultant mixture. Upon reaction end, the product (V) is recovered via conventionally employed techniques.

The introduction of the carbonyl or oxo group at C-7 of the nucleus is accomplished in several ways. One method comprises utilization of the reagent chromium trioxide in pyridine. In carrying out this reaction, chromic anhydride is gradually added to pyridine with stirring and cooling. The compound (V) is then added to the resulting mixture and oxidation is allowed to proceed for a period of time sufficient to complete the reaction. The product (IV) is then conventionally recovered.

An alternative procedure comprises utilizing a solution of N-bromosuccinimide in an inert solvent. This reaction is known per se and involves contacting and maintaining the steroid (V) with N-bromosuccinimide in boiling carbon tetrachloride while being irradiated with a 120 watt photoflood lamp. The product is then stirred with neutral alumina and is then reacted with chromium trioxide in pyridine as described above to furnish the oxidized product (VI).

Yet another procedure comprises conventional oxidation with t-butyl chromate such as described by Rao et al., JACS 78, 5660 (1956).

A particularly preferred method involves utilizing a photosensitized oxidation procedure such as that described by Schenck et al., Angew. Chem. 70, 595 (1958). In this process, the 7-keto function is introduced by visible light photosensitized oxygenation in pyridine using, as conventional sensitizers, eosin, hematoporphyrin, and the like. Initially formed is the 5-hydroperoxide-$\Delta^6$ derivative which converts to the desired 7-oxo-$\Delta^5$ compound upon exposure to a copper salt, notably cupric acetate.

In each of these procedures with the exception of the latter photosensitized oxidation by which the 7-oxo function is introduced, it is necessary to suitably protect from oxidation the hydroxy groups at C-3 and C-22. Such is conveniently accomplished by forming the diacetates thereof followed by hydrolysis after the oxidation procedure. Each of these procedures are conventional, the acetylation being done with acetic anhydride in pyridine and the hydrolysis being done with alkali metal hydroxide in lower alkanol medium.

Another particularly advantageous method of protecting these hydroxyl groups is through the trichloroethylcarbonate esters. These are prepared by treating the 3,22-dihydroxy compound (V) with excess 2,2,2-trichloroethoxycarbonyl chloride (a stable chloroformate prepared by passing phosgene through a benzene, trichloroethanol, diethylaniline solution for five hours followed by acidifying, washing and drying the organic phase and distilling the product) in pyridine with stirring at room temperature overnight. These conditions are equivalent to the conventional methods of preparing the other esters hereof. Upon the conclusion of the oxidation at C-7, these carbonate esters are readily removed by treating them with zinc dust in acetic acid with stirring for from one to three hours at room temperature or by brief reflux with zinc in methanol.

The foregoing process has certain important and novel aspects in itself. Thus, the individual process step of preparing the lactone product (II) from the aldehyde (I) is novel. In addition, the intermediates of this invention represented by Formulas II, III, and V are novel. Further, the intermediates of Formula IV and the intermediate six-membered ring lactones otherwise corresponding to the compounds of Formula IV are novel. The preferred members of these derivatives are represented by Formulas II', III', IV', IV'', and V'.

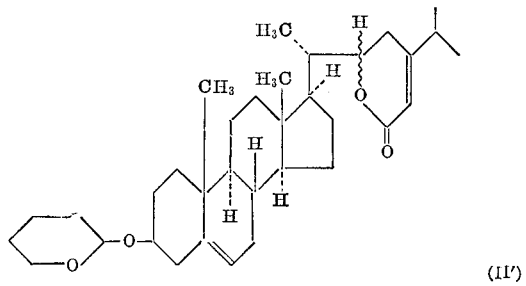

(II')

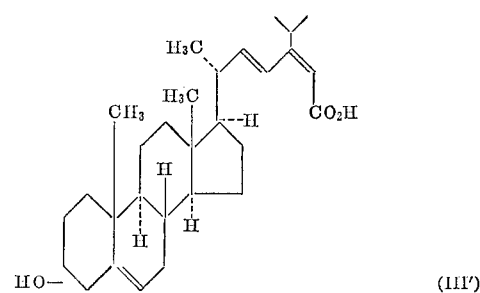

(III')

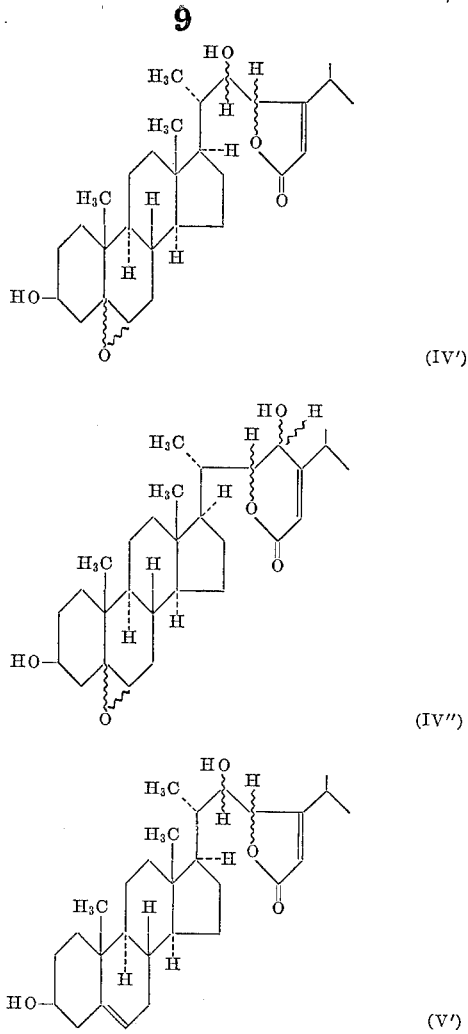

The following examples serve to further typify the manner by which the present invention can be practiced but, as such, should not be construed as limitations upon the overall scope hereof. Where the isomerism of asymmetric carbon atoms is not specified, namely, the C–22 and C–23 carbon atoms, both the alpha and beta forms of each asymmetric center are formed and are included within the scope hereof.

EXAMPLE 1

3β-hydroxy-22,23-bisnorchol-5-enoic acid methyl ester (40 g.) is dissolved in 500 ml. of benzene at room temperature. The resultant solution is dried by removing a few milliliters of solvent by distillation. Dihydropyran (40 ml.) is added to the dry solution. Following this addition, a solution of 200 mg. of p-toluenesulfonic acid in 50 ml. of benezene is added. The resultant reaction mixture is allowed to stand at room temperature for two hours after which time it is washed successively with aqueous bicarbonate solution and water, dried over sodium sulfate and evaporated to obtain the 3β-tetrahydropyran-2'-yloxy-22,23-bisnorchol-5-enoic acid methyl ester product.

The tetrahydropyran-2'-yloxy ether product thus obtained is dispersed in 600 ml. of dry ether at room temperature. Lithium aluminum hydride (5 g.) is dispersed in 500 ml. of diethyl ether. The steroid in ether solution. is added dropwise to the lithium aluminum hydride solution over a period of 40 minutes. Following this addition, this mixture is stirred at room temperature overnight. After this time, acetone is added cautiously in order to destroy excess lithium aluminum hydride reactant. Following this addition, anhydrous sodium sulfate solution is added to the mixture and it is then diluted with ethyl acetate. The diluted mixture is filtered and the filtrate separated and evaporated to dryness to obtain 3β-tetrahydropyran-2'-yloxy-24-hydroxy-22,23 - bisnorchol - 5-ene as a crystalline residue.

The crystalline product thus obtained is dissolved in a mixture of 240 ml. of dimethylsulfoxide, 240 ml. of methylene chloride, 12.8 ml. of pyridine and 6.4 ml. of trifluoroacetic acid at room temperature with stirring. Two portions of 25 g. each of dicyclohexylcarbodiimide are added at an interval of 15 minutes with stirring and at room temperature. After continuing the stirring of the resulting mixture for one hour at room temperature, an additional 25 g. portion of dicyclohexylcarbodiimide is added to the reaction mixture. The reaction is conducted for an additional hour at room temperature with stirring and, after this, 100 ml. of water are added. The diluted mixture is then stirred for another hour at room temperature after which time 700 ml. of diethyl ether are added. The resultant mixture is cooled to 0° C. and then filtered to remove dicyclohexylurea. The filtrate obtained after filtration is washed four times with water and then dried and evaporated to furnish a solid which is chromatographed on silica gel which has been deactivated with 5% water. Elution with benzene and methylene chloride: benzene (1:3) yields the 3β-tetrahydropyran-2'-yloxy-22, 23-bisnorchol-5-en-24-aldehyde product.

EXAMPLE 2

Similarly, the 3β-tetrahydrofuran-2'-yloxy-22,23 - bisnorchol-5-en-24-aldehyde product is ultimately prepared in accordance with the procedure of Example 1 when using the following procedure in lieu of the procedure set forth in the first paragraph thereof.

To a solution of 1 g. of 3β-hydroxy-22,23-bisnorchol-5-en-24-oic acid methyl ester in 20 ml. of benzene, is added 20 ml. of dihydrofuran. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutral, dried over anhydrous magnesium sulfate, and evaporated to dryness under reduced pressure. The oily residue crystallizes on the addition of ether to yield the 3β - tetrahydrofuran - 2' - yloxy-22,23-bisnorchol-5-en-24-oic acid methyl ether.

EXAMPLE 3

A mixture of 1 g. of 3β-hydroxy-22,23-bisnorchol-5-en-24-aldehyde (prepared as in Example 1 without adding the tetrahydropyranyl grouping), 4 ml. of pyridine and 2 ml. of acetic anhydride is allowed to stand at room temperature for 15 hours. The mixture is then poured into ice water and the solid which forms is collected by filtration, washed with water and dried to yield 3β-acetoxy-22,23-bisnorchol-5-en-24-aldehyde which may be further purified through recrystallization from acetone:hexane.

In like manner, the procedure of this example can be modified in reactant choice to obtain the corresponding conventional carboxylic acid 3β-esters, for example, the 3β-propionyloxy-, 3β-benzoyloxy-, 3β-butyryloxy-, 3β-caproyloxy-, 3β-adamantoyloxy-, 3β-heptanoyloxy-, 3β-trimethylacetoxy-, 3β-t-butylacetoxy-, 3β-phenoxyacetoxy-, 3β-cyclopentylpropionyloxy- and 3β-aminoacetoxy-22, 23-bisnorchol-5-en-24-aldehyde compounds.

EXAMPLE 4

A sodium hydride suspension is prepared by mixing 6 g. of sodium hydride and 100 ml. of anhydrous tetrahydrofuran together under a nitrogen atmosphere and with stirring. While maintaining the nitrogen atmosphere, 56 g. of triethylphosphonoacetate is added to the sodium hydride suspension. This addition is conducted in a dropwise fashion over a period of 45 minutes with some initial external cooling. After the solution becomes clear, 21.5 g. of 3-methylbutan-2-one are added dropwise thereto over a 30 minute period. Following this time, the resulting mixture is allowed to stand at room temperature overnight. The temperature of the mixture is then raised to the boiling point and maintained under reflux for 20 minutes. It is then poured into ice water. The resultant aqueous mixture is extracted with diethyl ether. The ether extracts are distilled to obtain the ethyl 3,4-dimethylpent-2-enoate product containing both the cis and trans isomers.

The other lower alkyl 3,4-dimethylpent-2-enoate esters are prepared by employing the respective phosphonoacetate reactant.

The reagent lithium triphenylmethide is prepared by dissolving 1.83 g. of triphenylmethane in 20 ml. of tetrahydrofuran. To the resultant solution is added 4.7 ml. of a 1.6 M solution of n-butyl lithium in hexane. This addition is carried out at room temperature with stirring and under an atmosphere of nitrogen. Following this addition, the mixture is allowed to stand at room temperature for one hour during which time the temperature is reduced to −20° C. 1.17 grams of ethyl 3,4-dimethylpent-2-enoate is added to the cooled solution. The temperature of the resulting solution is maintained at −20° C. for 5–15 minutes depending on the rate of disappearance of the trityl lithium anion. After this time, it is cooled to −78° C. A solution of 2.07 g. of 3β-tetrahydropyran-2′-yloxy-22,23-bisnorchol-5-en-24-aldehyde which is dispersed in 10 ml. of tetrahydrofuran is added to the cooled mixture over a period of five minutes. After this addition is complete, the temperature of the resultant mixture is allowed to rise to 0° C. over a 45 minute period and then is maintained at 0° C. for an additional 45 minutes. After this time, the reaction mixture is poured into ice water and neutralized with acetic acid. The neutralized mixture is extracted with diethyl ether and the extracts combined and chromatographed on silica gel (deactivated with 10% water), the elution being conducted with benzene and methylene chloride to obtain the 3β-tetrahydropyran-2′-yloxy-22-hydroxy-24-carboxymethylenecholest-5-en 22,24″-lactone product.

The foregoing, when performed with the other C-3β ethers and esters prepared in Examples 2 and 3, is useful in preparing the following compounds:

3β-tetrahydrofuran-2′-yloxy-22-hydroxy-24-carboxymethylenecholest-5-ene 22, 24″-lactone,
3β-acetoxy-22-hydroxy-24-carboxymethylenecholest-5-ene 22,24″-lactone,
3β-propionyloxy-22-hydroxy-24-carboxymethylenecholest-5-ene 22,24″-lactone,
3β-butyryloxy-22-hydroxy-24-carboxymethylenecholest-5-ene 22,24″-lactone,
3β-caproyloxy-22-hydroxy-24-carboxymethylenecholest-5-ene 22,24″-lactone,
3β-adamantoyloxy-22-hydroxy-24-carboxymethylenecholest-5-ene 22,24″-lactone,
3β-heptanoyloxy-22-hydroxy-24-carboxymethylenecholest-5-ene 22,24″-lactone,
3β-benzoyloxy-22-hydroxy-24-carboxymethylenecholest-5-ene 22,24″-lactone,
3β-trimethylacetoxy-22-hydroxy-24-carboxymethylenecholest-5-ene 22,24″-lactone,
3β-t-butylacetoxy-22-hydroxy-24-carboxymethylenecholest-5-ene 22,24″-lactone,
3β-phenoxyacetoxy-22-hydroxy-24-carboxymethylenecholest-5-ene 22,24″-lactone,
3β-cyclopentylpropionyloxy-22-hydroxy-24-carboxymethylenecholest-5-ene 22,24″-lactone, and
3β-aminoacetoxy-22-hydroxy-24-carboxymethylenecholest-5-ene 22,24″-lactone.

Alternatively, the procedure set forth in paragraph 3 of this example can be practiced with 3β-hydroxy-22,23-bisnorchol-5-en-24-aldehyde utilizing about a two-fold molar excess of the lower alkyl 3,4-dimethylpent-2-enoate:lithium triphenylmethide reagent to afford the 3β,22-dihydroxy-24-carboxymethylenecholest-5-ene 22,24″-lactone product.

The C-3β esters listed above can be hydrolyzed in accordance with the following representative procedure to afford the corresponding 3β-hydroxy compounds.

A solution of 1 g. of 3β-acetoxy-22-hydroxy-24-carboxymethylenecholest-5-ene 22,24″-lactone in 50 ml. of methanol is heated at reflux for three hours with a solution of potassium hydroxide in 1 ml. of water. The reaction mixture is then poured into icewater and the solid which forms collected by filtration, washed with water to neutrality and dried to yield 3β,22-dihydroxy-24-carboxymethylenecholest-5-ene 22,24″-lactone which is recrystalized from methylene chloride:ether.

The C-3β ethers listed above can be hydrolyzed in accordance with the following representative procedure to afford the corresponding 3β-hydroxy compounds.

To a mixture of 1 g. of 3β-tetrahydropyran-2′-yloxy-22-hydroxy-24-carboxymethylenecholest-5-ene 22,24″-lactone in 30 ml. of acetic acid is added 0.5 ml. of 2 N hydrochloric acid. The mixture is allowed to stand five hours at room temperature and then diluted with icewater and extracted several times with methylene chloride. The combined extracts are washed with water to neutrality, dried over sodium sulfate and evaporated to dryness to yield 3β,22 - dihydroxy - 24-carboxymethylenecholest-5-ene 22, 24″-lactone.

EXAMPLE 5

3β - tetrahydropyran - 2′-yloxy-22-hydroxy-24-carboxymethylenecholest-5-ene 22,24″-lactone (600 mg.) is added to 20 ml. of 2% methanolic sodium hydroxide solution at room temperature and the temperature of the resultant mixture is raised to the boiling point and maintained at reflux for five hours. After this period, the mixture is diluted with water and the diluted mixture is acidified to a pH of 6. The acidified mixture is extracted with ether, the ether extracts being combined and evaporated to a solid which is crystallized from methylene chloride to provide the 3β - tetrahydropyran-2′-yloxy-24-carboxymethylenecholesta-5,22-diene product.

When utilizing the corresponding C-3β esters listed in Example 4 or the product obtained in Example 4 when employing the 3β-hydroxy starting compound, the corresponding 3β - hydroxy-24-carboxymethylenecholesta-5,22-diene product is prepared.

The thus obtained product, 3β - tetrahydropyran - 2′-yloxy-24-carboxymethylenecholesta-5,22-diene, (600 mg.) is dispersed in a solution of 15 ml. of methanol containing 0.5 ml. of a concentrated hydrochloric acid:water (1:3) mixture. This solution is warmed to 20° C. for about 15 minutes. Ice water (150 ml.) is added and the aqueous mixture is filtered to obtain a solid which is recrystalized from acetone to obtain the 3β-hydroxy-24-carboxymethylenecholesta-5,22-diene product.

In like manner, the 3β-hydroxy product is obtained when employing the other C-3β ethers as starting compounds herein.

EXAMPLE 6

A mixture of 3β-hydroxy-24-carboxymethylenecholesta-5,22-diene (1.56 g., 3.5 mmoles) and m-chloroperbenzoic acid (1.33 g., 7.70 mmoles), which are dispersed in 70 ml. of methylene chloride, is stirred at room temperature for three days. The mixture is then diluted with 100 ml. of ether and the diluted mixture shaken periodically with 75 ml. of 10% sodium carbonate solution for an hour. The combined alkaline layers are then acidified to a pH of 2 with 5% hydrochloric acid and the resulting solution is extracted with ethyl acetate. The combined organic extracts are then washed with two 50 ml. portions of 5% sodium bicarbonate and then water. The washed extracts are dried over sodium sulfate and evaporated. The residue obtained after evaporation is chromatographed on silica gel eluting with an acetone:methylene chloride mixture to obtain the 3β,22α$_F$,23α$_F$ - trihydroxy - 5,6-oxido-24-carboxymethylenecholestane 23,24″ - lactone; 3β,22β$_F$,23β$_F$-trihydroxy-5,6 - oxido-24-carboxymethylenecholestane 23,24″-lactone; 3β,22α$_F$,23α$_F$ - trihydroxy - 5,6-oxido-24-carboxymethylenecholestane 22,24″ - lactone; and 3β,22β$_F$,23β$_F$-trihydroxy-5,6-oxido-24-carboxymethylenecholestane 22,24″-lactone products which are separated by chromatography and recrystallized from ether.

The foregoing procedure is repeated except that each of perbenzoic acid, peracetic acid, and monoperphthalic acid are substituted for m-chloroperbenzoic acid with the same results in each instance.

The foregoing procedures are repeated employing 12.4 mmoles of each of the peracids with similar results in each instance.

EXAMPLE 7

A mixture of 3β-hydroxy-24-carboxymethylenecholesta-5,22-diene (200 mg., 0.45 mmole) and m-chloroperbenzoic acid (77 mg., 0.45 mmole), which are dispersed in 20 ml. of methylene chloride, is stirred at room temperature for about 45 minutes. The mixture is then diluted with ether and the diluted mixture washed with dilute sodium sulfite and then 5% potassium bicarbonate. The washed mixture is dried over sodium sulfate, evaporated and recrystallized from hexane:acetone to obtain the 3β-hydroxy - 5,6 - oxido - 24-carboxymethylenecholest-22-ene product.

The foregoing is repeated using each of perbenzoic acid, peracetic acid, and monoperphthalic acid with similar results in each instance.

The foregoing procedures are repeated employing 0.50 mmole of each of the peracids with similar results in each instance.

To a solution of 50 mg. (0.110 mmole) of 3β-hydroxy-5,6-oxido-24-carboxymethylenecholest-22-ene in 3 ml. of anhydrous pyridine is added, portionwise and with stirring, a solution of 29 mg. (0.113 mmole) of osmium tetroxide in 0.5 ml. of anhydrous pyridine. The resultant mixture is allowed to stand overnight at room temperature. The reaction mixture is treated with a solution of 12 ml. of a 3.5% solution of sodium bisulfite in 50% aqueous pyridine. After 20 minutes, the mixture is diluted with water and the diluted mixture extracted with methylene chloride. The organic layer is collected and shaken thoroughly with 10% hydrochloric acid. It is then washed with 5% potassium bicarbonate and dried over sodium sulfate. The dried mixture is evaporated to a residue which is recrystallized from hexane:acetone to obtain the 3β,22α$_F$,23β$_F$-trihydroxy - 5,6-oxido-24-carboxymethylenecholestane 23,24″-lactone and 3β,22β$_F$,23α$_F$ - trihydroxy - 5,6-oxido-24-carboxymethylenecholestane 23,24″-lactone products which are separated by chromatography.

EXAMPLE 8

3β,22,23-trihydroxy-5,6-oxido - 24 - carboxymethylenecholestane 22,24″-lactone (45 mg.) is dissolved in 2 ml. of a 5% solution of potassium hydroxide in a methanol:water (20:1) mixture. After 45 minutes at room temperature, the mixture is diluted with water to a clear solution, acidified with 10% hydrochloric acid and extracted with ether. The extracts are combined and dried and evaporated to an oil. The oil is chromatographed on silica gel to obtain the 3β,22,23-trihydroxy-5,6-oxido-24-carboxymethylenecholestane 23,34″-lactone product.

Alternatively, the isomerism can be conducted as follows:

A solution of 6 mg. of 3β,22,23-trihydroxy-5,6-oxido-24-carboxymethylenecholestane 22,24″-lactone dispersed in 3 ml. of a 5% solution of potassium carbonate in methanol:water (3:1) is allowed to stand at room temperature for one day. Water is added and the resultant clear mixture acidified with 10% hydrogen chloride and this extracted with ether. The ether extracts are combined and dried and evaporated to an oil which is chromatographed on silica gel to obtain the 3β,22,23-trihydroxy-5,6-oxido-24-carboxymethylenecholestane 23,24″ - lactone product.

EXAMPLE 9

Sodium iodide (0.3 g., 2 mmoles) and sodium acetate (0.1 g.) are dissolved in a mixture of 2 ml. of acetic acid and four drops of water. The 3β,22,23-trihydroxy-5,6-oxido-24-carboxymethylenecholestane 23,24″-lactone (40 mg., 0.085 mmole) is then dissolved in the mixture, whereupon 0.3 g. of zinc dust is added portionwise. After stirring the resulting mixture for 4.5 hours at room temperature, the reaction is diluted with 20 ml. of ethyl acetate and the diluted mixture is decanted. The residual metal is washed with additional solvent. The organic phase is separated and washed with 5% sodium bicarbonate solution containing a few crystals of sodium bisulfite. The washed organic phase is dried and evaporated yielding an oil product which is crystallized from ether to obtain the 3β,22,23 - trihydroxy - 24 - carboxymethylenecholest - 5 - ene 23,24″-lactone product.

The corresponding Δ$^5$-5-membered lactone products obtained via the procedures of Example 9 include, as specific isomers, 3β,22α,23α-trihydroxy-24-carboxymethylenecholest-5-ene 23,24″-lactone, 3β,22β,23β-trihydroxy - 24-carboxymethylenecholest-5-ene 23,24″ - lactone, 3β,22α,23β-trihydroxy-24-carboxymethylenecholest - 5 - ene 23,24″-lactone, and 3β,22β,23α-trihydroxy - 24 - carboxymethylenecholest-5-ene 23,24″-lactone.

EXAMPLE 10

A mixture of 1 g. of 3β,22,23-trihydroxy-24-carboxymethylenecholest-5-ene 23,24″-lactone, 10 ml. of pyridine and 10 ml. of 2′,2′,2′-trichloroethoxycarbonyl chloride is allowed to stand at room temperature for 15 hours. The mixture is then poured into ice water and the solid which forms is collected by filtration, dried to yield the 3β,22-di(2′,2′,2′-trichloroethylcarbonyldioxy) - 23 - hydroxy - 24-carboxymethylenecholest - 5 - ene 23,24″-lactone product which may be further purified through recrystallization from acetone:hexane.

EXAMPLE 11

A mixture of 1 g. of 3β,22,23-trihydroxy-24-carboxymethylenecholest-5-ene 23,24″-lactone, 10 ml. of pyridine and 4 ml. of acetic anhydride is allowed to stand at room temperature for 15 hours. The mixture is then poured into ice water and the solid which forms is collected by filtration, washed with water and dried to yield the 3β,22-diacetoxy-23-hydroxy-24-carboxymethylenecholest - 5 - ene-23,24″-lactone product which may be further purified through recrystallization from acetone:hexane.

EXAMPLE 12

A solution of 6 g. of 3β,22-di(2′,2′,2′-trichloroethylcarbonyldioxy)-23-hydroxy-24 - carboxymethylenecholest-5-ene 23,24″-lactone dispersed in 120 ml. of pyridine is added to a mixture of 6 g. of chromic trioxide in 60 ml. of pyridine. The reaction mixture is allowed to stand at room temperature for 75 hours, diluted with ethyl acetate and filtered through Celite diatomaceous earth. The filtrate is washed well with water, dried and evaporated to dryness to obtain 3β,22-di(2′,2′,2′-trichloroethylcarbonyldioxy) - 23-hydroxy-24-carboxymethylenecholest-5-en-7-one 23,24″-lactone product which is isolated by chromatography and further purified by recrystallization from acetone:hexane.

The corresponding 3β,22-diacetoxy-23-hydroxy-24-carboxymethylenecholest-5-en-7-one 23,24″-lactone product can be likewise prepared from the diacetoxy starting compound.

EXAMPLE 13

A solution of 1 g. of 3β,22-di(2′,2′,2′-trichloroethylcarbonyldioxy) - 23-hydroxy-24-carboxymethylenecholest-5-ene 23,24″-lactone in 500 ml. of carbon tetrachloride is prepared. The temperature of this solution is raised to the boiling point and maintained under reflux while 2 grams of finely powdered N-bromosuccinimide is added portionwise thereto. Refluxing is continued for 10 minutes under a 120 watt flood lamp after which time the reaction mixture is cooled and filtered. The filtrate is stirred with 40 grams of neutral alumina for three hours at room temperature. The mixture is filtered and the aluminum cake washed with 500 ml. of acetone. The combined filtrate from such washings are evaporated to dryness and the residue is dissolved in 25 ml. of pyridine. This solution is then slowly added to a stirred mixture of 3 g. of chromium trioxide in 50 ml. of pyridine. After stirring the resultant mixture overnight at room temperature, the slurry is diluted with 200 mg. of ethyl acetate and filtered first through a small pad of filter-aid and then through an alumina column. Both filter cakes are washed with ethyl acetate and the combined filtrates and washings evaporated to dryness. The residue is crystallized from acetone to obtain the 3β,22-di(2',2',2'-trichloroethylcarbonyldioxy)-23-hydroxy-24-carboxymethylenecholest - 5-en-7-one 23,24"-lactone product.

Similarly, the 3β,22-diacetoxy-23-hydroxy-24-carboxymethylenecholest-5-en-7-one 23,24"-lactone product is obtained from the respective starting compound.

EXAMPLE 14

The 3β,22,23 - trihydroxy - 24 - methylenecholest-5-ene 23,24"-lactone (36 mg., 0.079 mmole) is dissolved in 10 ml. of pyridine at room temperature. Hematoporphyrin (18 mg.) is then added to the resultant solution and the resultant oxygenated solution is irradiated with a fluorescent light source while supplying external cooling to maintain the temperature of the reaction mixture at about 20 to 25° C. After maintaining these conditions for 40 hours, the mixture is diluted with 60 ml. of ether and this stirred with 0.18 g. of decolorizing carbon for 40 minutes. Then the mixture is filtered and the filtrate evaporated at room temperature under gradually reducing pressure to a colorless pyridine solution. To this solution is added 50 mg. of cupric acetate. The resultant mixture is allowed to stand for five hours at room temperature. After this time, the mixture is diluted with 50 ml. of water and the diluted mixture extracted with methylene chloride. The organic extracts are evaporated to dryness under vacuum to an oil. This oil is chromatographed on preparative "tlc" plates to yield 3β,22,23-trihydroxy-24-carboxymethylenecholest-5-en-7-one 23,24"-lactone product which is further purified by recrystallization from hexane:acetone.

EXAMPLE 15

3β,22 - diacetoxy - 23 - hydroxy-24-carboxymethylenecholest-5-ene 23,24"-lactone (1 g.) is dispersed in 20 ml. of carbon tetrachloride and the resultant solution stirred and warmed to 80° C. A mixture of 25 ml. of t-butyl chromate dispersed in carbon tetrachloride, acetic acid and acetic anhydride is added dropwise over a period of 15 minutes to the warm steroid solution. The reaction mixture is maintained at 80° C. with stirring for about 12 hours. A 5% solution of aqueous oxalic acid is then added thereto followed by 1 g. of solid oxalic acid. The organic layer is separated, washed with water, dried, filtered and evaporated under reduced pressure. The residue is chromatographed on alumina to obtain the 3β,22-diacetoxy-23 - hydroxy - 24 - carboxymethylenecholest-5-en-7-one 23,24"-lactone product.

EXAMPLE 16

One gram of 3β,22-di(2',2',2'-trichloroethylcarbonyldioxy) - 23 - hydroxy - 24 - carboxymethylenecholest - 5-en-7-one 23,24"-lactone is added to a mixture of 1 g. of zinc dust in 10 ml. of glacial acetic acid. The addition is carried out at room temperature and with stirring. The stirring is maintained after the addition and at room temperature for one hour. After this time, the reaction mixture is filtered and the filtrate is diluted with water. The diluted mixture is extracted with chloroform and the extracts evaporated to provide a residue which is recrystalized from acetone:hexane to obtain the 3β,22,23-trihydroxy - 24 - carboxymethylenecholest - 5-en-7-one 23,24"-lactone product.

EXAMPLE 17

One gram of 3β,22-diacetoxy-23-hydroxy-24-carboxymetthylenecholest-5-en-7-one 23,24"-lactone is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 3β,22,23-trihydroxy-24-carboxymethylenecholest-5-en-7-one 23,24"-lactone which is collected by filtration and recrystallized from acetone:hexane.

The corresponding products obtained via the procedures of Examples 14, 16 and 17 include, as specific isomers: $3\beta,22\alpha_F,23\alpha_F$ - trihydroxy - 24 - carboxymethylenecholest-5 - en - 7 - one 23,24" - lactone; $3\beta,22\beta_F,23\beta_F$ - trihydroxy - 24 - carboxymethylenecholest - 5 - en - 7 - one 23,24" - lactone; $3\beta,22\alpha_F,23\beta_F$ - trihydroxy - 24 - carboxymethylenecholest - 5 - en - 7 - one 23,24" - lactone; and $3\beta,22\beta_F,23\alpha_F$ - trihydroxy - 24 - carboxymethylenecholest-5-en-7-one 23,24"-lactone.

What is claimed is:
1. The process which comprises the steps of:
 (a) treating a 3β-oxygenated-22,23-bisnorchol-5-en-24-aldehyde with a trans 3,4-dimethylpent-2-enoic acid lower alkyl ester and lithium triphenylmethide to furnish the corresponding 3β-oxygenated-22-hydroxy-24-carboxymethylenecholest-5-ene 22,24"-lactone;
 (b) converting said 3β-oxygenated-22-hydroxy-24-carboxymethylenecholest - 5 - ene 22,24"-lactone to the corresponding 3β - oxygenated-24-carboxymethylenecholesta-5,22-diene by alkaline hydrolysis;
 (c) treating said 3β-oxygenated-24-carboxymethylenecholesta-5,22-diene with at least about two chemical equivalents of peracid or successively with about one chemical equivalent each of peracid and osmium tetroxide to furnish the corresponding 3β-oxygenated-5,6 - oxido - 22,23 - dihydroxy-24-carboxymethylenecholestane 23,24"-lactone;
 (d) treating the 3β-oxygenated-5,6-oxido-22,23-dihydroxy-24-carboxymethylenecholestane 23,24"-lactone compound with zinc dust, sodium iodide, and sodium acetate to the corresponding 3β-oxygenated-22,23-dihydroxy - 24 - carboxymethylenecholest - 5 - ene 23,24"-lactone; and
 (e) oxidizing said 3β-oxygenated-22,23-dihydroxy-24-carboxymethylenecholest - 5- ene 23,24" - lactone to furnish the corresponding 3β-oxygenated-22,23-dihydroxy - 24 - carboxymethylenecholest - 5 - en-7-one 23,24"-lactone product.

2. The process claimed in claim 1 wherein said 3β-oxygenated - 22,23 - bisnorchol - 5 - en - 24 - aldehyde in step (a) is 3β - tetrahydropyran - 2' - yloxy - 22,23 - bisnorchol - 5 - en - 24 - aldehyde and including the step between step (b) and step (c) of acid hydrolysis such that the 3β-oxygenated compounds for step (c) and subsequent steps are the corresponding 3β-hydroxy derivatives thereof.

3. The process claimed in claim 1 wherein the product $3\beta,22\alpha_F,23\alpha_F$ - trihydroxy - 24 - carboxymethylenecholest-5-en-7-one 23,24"-lactone is prepared.

4. The process claimed in claim 1 wherein the product $3\beta,22\beta_F,23\beta_F$ - trihydroxy - 24 - carboxymethylenecholest-5-en-7-one 23,24"-lactone is prepared.

5. The process claimed in claim 1 wherein the product $3\beta,22\alpha_F,23\beta_F$ - trihydroxy - 24 - carboxymethylenecholest-5-en-7-one 23,24"-lactone is prepared.

6. The process claimed in claim 1 wherein the product

3β,22β_F,23α_F - trihydroxy - 24 - carboxymethylenecholest-5-en-7-one 23,24″-lactone is prepared.

7. The process which comprises treating a 3β-oxygenated - 22,23 - bisnorchol - 5 - en - 24 - aldehyde with a trans 3,4 - dimethylpent - 2 - enoic acid lower alkyl ester and lithium triphenylmethide to furnish the corresponding 3β - oxygenated - 22 - hydroxy - 24 - carboxymethylenecholest-5-ene 22,24″-lactone.

8. The compound corresponding to one of Formulas II′, III′, IV′, IV‴ and V′:

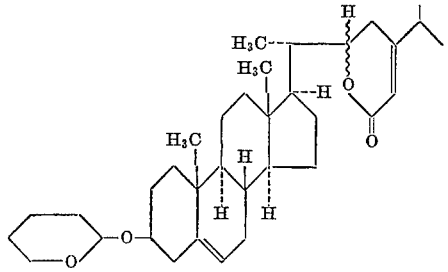

(II′)

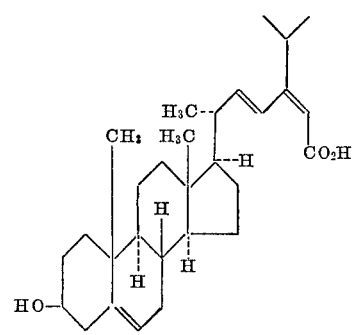

(III′)

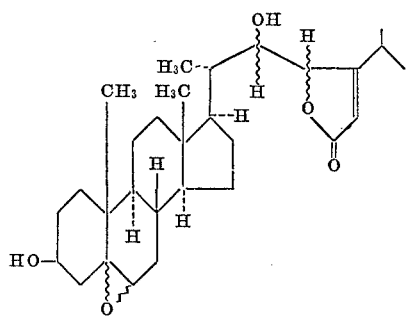

(IV′)

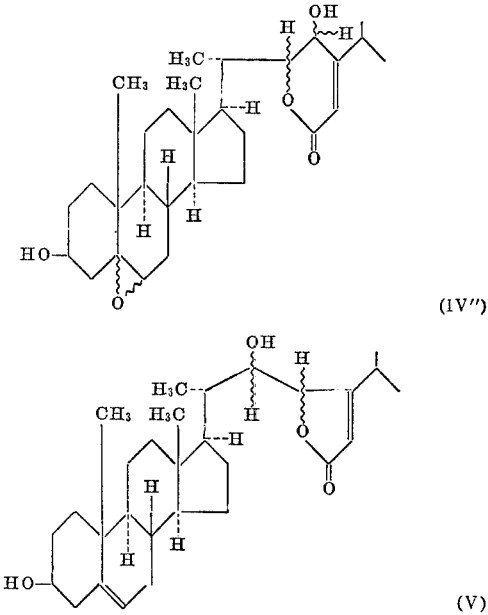

(IV″)

(V)

9. The compound 3β,22α_F,22α_F - trihydroxy - 24 - carboxymethylenecholest-5-en-7-one 23,24″-lactone.

10. The compound 3β,22β_F,23β_F - trihydroxy - 24 - carboxymethylenecholest-5-en-7-one 23,24″-lactone.

11. The compound 3β,22β_F,23α_F - trihydroxy - 24 - carboxymethylenecholest-5-en-7-one 23,24″-lactone.

12. The compound 3β,22α_F,23β_F - trihydroxy - 24 - carboxymethylenecholest-5-en-7-one 23,24″-lactone.

References Cited

UNITED STATES PATENTS

| 2,362,408 | 11/1944 | Ruzicka | 260—239.5 |
| 2,386,749 | 3/1943 | Ruzicka | 260—239.5 |
| 2,398,881 | 4/1946 | Ruzicka | 260—239.5 |

LEWIS GOTTS, Primary Examiner

ETHEL G. LOVE, Assistant Examiner

U.S. Cl. X.R.

71—66.88; 204—158; 260—239.55, 397.1, 397.4, 486; 424—241